Nov. 29, 1960 T. H. CROWLEY 2,962,552

SWITCHING SYSTEM

Filed Sept. 17, 1958 4 Sheets-Sheet 1

INVENTOR
T. H. CROWLEY
BY
R. C. Winter
ATTORNEY

Nov. 29, 1960 T. H. CROWLEY 2,962,552

SWITCHING SYSTEM

Filed Sept. 17, 1958 4 Sheets-Sheet 2

INVENTOR
T. H. CROWLEY
BY
R. C. Winter
ATTORNEY

Nov. 29, 1960 T. H. CROWLEY 2,962,552

SWITCHING SYSTEM

Filed Sept. 17, 1958 4 Sheets-Sheet 3

INVENTOR
T. H. CROWLEY
BY
R. C. Winter
ATTORNEY

Nov. 29, 1960 T. H. CROWLEY 2,962,552

SWITCHING SYSTEM

Filed Sept. 17, 1958 4 Sheets-Sheet 4

INVENTOR
T. H. CROWLEY
BY
R. C. Winter
ATTORNEY 2,962,552

SWITCHING SYSTEM

Thomas H. Crowley, Madison, N.J., assignor to Bell Telephone Laboratories, Incorporated, New York, N.Y., a corporation of New York Filed Sept. 17, 1958, Ser. No. 761,632

18 Claims. (Cl. 179—15)

This invention relates to electrical transmission circuits and more particularly to transmission circuits including gating networks applicable to information handling systems.

In present day high speed information handling systems, a practice receiving considerable attention in the transfer of information between remote localities is time sharing, or time division multiplexing, which permits the simultaneous exchange of information between each one of a plurality of communication terminals and a corresponding one of a remote plurality of terminals over a common communication link. Time sharing requires that in successive short time intervals each pair of terminals in communication be assigned a frequently recurring discrete interval of time, or time slot, during which information may be sampled and received. In the interval between appearances of the time slot assigned to a particular pair of terminals, the common communication link is available to other communication terminals in their preassigned time slots. Sampling at a sufficiently rapid rate, filtering in transmission, and expeditious transfer of the sampled information to and from the common communication link, are facets of the operation which permit the formation at one terminal of the communicating pair of an accurate reproduction of the information transmitted from the other terminal of the pair.

Time sharing may be utilized, for example, in various systems which require connection of a plurality of communication devices via a common communication link and in which a substantial reduction in expensive transmission facilities is desired. Systems of this type are described in a patent application of E. T. Burton, A. L. Robinson and E. L. Younker, Serial No. 364,258, filed June 26, 1953, now patent 2,917,583, issued December 15, 1959, and in a patent application of D. B. James, J. D. Johannesen, M. Karnaugh and W. A. Malthaner, Serial No. 760,502, filed September 11, 1958, now patent 2,957,949, issued October 25, 1960.

A four-wire transmission network advantageously is utilized as the common communication link in such systems. This, of course, introduces the requirement of proper termination of the four-wire common link in each two-wire terminating line circuit, as priorly performed by various hybriding arrangements well known in the art. It is also necessary to incorporate in such systems a gating network which permits the complete transfer of information during the time slot interval assigned to a line terminal and complete obstruction to transfer of information at other times.

A gating network satisfactory for this purpose is disclosed in a patent application of D. B. James and J. D. Johannesen, Serial No. 702,149, filed December 11, 1957, now Patent 2,936,338, issued May 10, 1960. In accordance with their disclosure, a single filter and gate per line provide information samples to the four-wire common communication link. During the period that each such line gate is enabled, information is transmitted to and received from the common communication link through sequentially operated "send" and "receive" gates, respectively. The latter gates are enabled once during each time slot interval and thus may be common to all line terminals at one end of the common link. This arrangement, referred to as the "time shared gated hybrid" eliminates considerable per line equipment required in hybriding arrangements employed in space division communication systems.

In the aforementioned gated hybrid arrangement, each line gate necessarily is enabled for the entire period of sequential enablement of the "send" and "receive" gates in the common link. Thus the minimum time slot interval for the system is the time required for transfer of information through the "send" and "receive" gates in sequence. This in turn establishes the limit on the traffic that the system can bear. Also, the interval of line gate operation is one factor in determining the complexity of the equipment required for line gate selection. The fact that a line gate must be operated during the sequence of common link gate operations during each time slot interval thus contributes to this complexity.

It is a general object of this invention to provide an improved signal switching system. More specifically, it is an object of this invention to provide an improved time division switching system capable of transmitting information between a plurality of remote terminals over a common communication link.

It is a further object of this invention to provide a four-wire transmission system with an improved coupling to the two-wire terminals which permits more rapid time division switching operation.

It is another object of this invention to provide greater flexibility in the terminating line equipment, which will also permit simplification of essential control equipment for its operation.

These and other objects of this invention are attained in one specific illustrative embodiment of this invention wherein a transmission network of the type described in the aforementioned application of Messrs. Burton, Robinson and Younker comprises a plurality of gates in the four-wire common communication link, a single filter and gate for each two-wire line terminal, in addition to the conventional repeat coil for connection to the terminal, and storage means connected between the line gates and common link gates.

Low pass filter networks terminated in a shunt capacitance are employed in the line terminal equipment and a small inductance is inserted in the transmission path to permit virtually lossless transfer of information stored in the shunt capacitance through the line gates to the storage means between the line gates and common link gates. The latter storage means advantageously may comprise a capacitance. This combination of capacitance, inductance and gates is referred to as the "resonant transfer circuit" and is described in detail in W. D. Lewis patent application Serial No. 633,358, filed January 9, 1957, now Patent 2,936,337, issued May 10, 1960. A similar resonant transfer occurs upon the enablement of one of the common link gates. Such enablement permits passage of the signal on the storage capacitance through the enabled common link gate to a similar storage capacitance in one transmission channel of the common link.

The timing of the gate operation in the system is arranged such that during operation of the "receive" gate, a resonant transfer of remote line information from the common link to the intermediate storage means is completed. Thereafter a selected line gate is enabled, and a resonant transfer of information occurs between line and intermediate storage means; i.e., information stored in the line filter capacitance is transferred to the intermediate storage capacitance, and simultaneously information stored in the intermediate storage capacitance is transferred to the line filter capacitance. The line gate is then disabled and the "send" gate in the common link is enabled to permit transfer of the information from the intermediate storage means to the common link storage means. This sequence of operations is completed in one time slot interval.

The line terminal assigned the succeeding time slot interval will have its line gate enabled at the begining of such succeeding interval to receive the information then stored in the intermediate capacitance. Residual energy in the intermediate storage capacitance is removed with a clamp between operations of the "send" and "receive" gates. The same circuit and sequence of operations, of course, will be utilized at the other end of the common communication link.

Thus it may be seen that the intermediate storage capacitance incorporates flexibility in the hybrid arrangement by permitting the operation of line gate, "send" gate and "receive" gate in sequence and each for only the short interval required to effect a resonant transfer. In this fashion the instant gate hybrid arrangement constitutes an improvement over that shown in the James-Johannesen application referred to hereinbefore.

A gating circuit which satisfies the requirements in this system of alternate zero and infinite impedance to current flow in either direction is shown in J. D. Johannesen, P. B. Myers and J. E. Schwenker patent application Serial No. 570,530, filed March 9, 1956, now Patent 2,899,570, issued August 11, 1959. The circuit comprises a pair of transistors having common bases and common emitters and a magnetic core coupled to the base and emitter of each transistor. Such a gating circuit may be associated with a terminal, such as a telephone station, by the connection of the station line to the collector of one transistor through a low pass filter and the connection of the collector of the other transistor to the common link. The gate is activated to allow passage of signals herethrough for an interval sufficient to transfer information samples to and from the common link. Gate control is effected by application of time pulses to the magnetic core. The "send," "receive" and various clamping gates in the common link, as well as the line gate, advantageously may be of this two-transistor type.

Time division switching is necessarily performed at high speed. It has been found that in order to maintain proper fidelity, samples of information at each line terminal must be taken at a rate at least double the highest voice frequency to be transmitted. A rate commonly employed, which satisfies this requirement, is 8,000 cycles per second. Thus a sample of information at each terminal will be taken every $\frac{1}{8000}$ of a second. Considering the use of 24 time slots per cycle as a reasonable figure, each time slot interval thus equates to a duration of approximately 5 microseconds. During this 5 microsecond time slot interval various operations must be performed including translation, selection and control of the line gates, enablement of the line gates for a period sufficient to perform the resonant transfer of information to and from the common link, enablement of the "send" and "receive" gates, and complete discharge of the common link storage capacitance.

The incorporation of an intermediate storage capacitance in the gated hybrid, in accordance with one aspect of this invention, permits accomplishment of all of these operations during such a time slot interval while at the same time permitting simplification of line gate controls. Also, in accordance with another aspect of the invention, the incorporation of intermediate gates and additional intermediate storage capacitance permits reduction of the time slot interval and greater flexibility in systems requiring, for example, pulse code modulation in transmission and intraoffice connections.

It is a feature of this invention that a gated hybrid network in a four-wire time division communication system comprise a line gate in each line circuit, "send" and "receive" gates at each end of a common communication link, and storage means intermediate the line and common link gates.

It is another feature of this invention that the hybrid network comprise a plurality of gates and storage means intermediate the line and common link gates.

A complete understanding of these and other features of the invention may be gained from consideration of the following detailed description, together with the accompanying drawing, in which.

Figure 1:
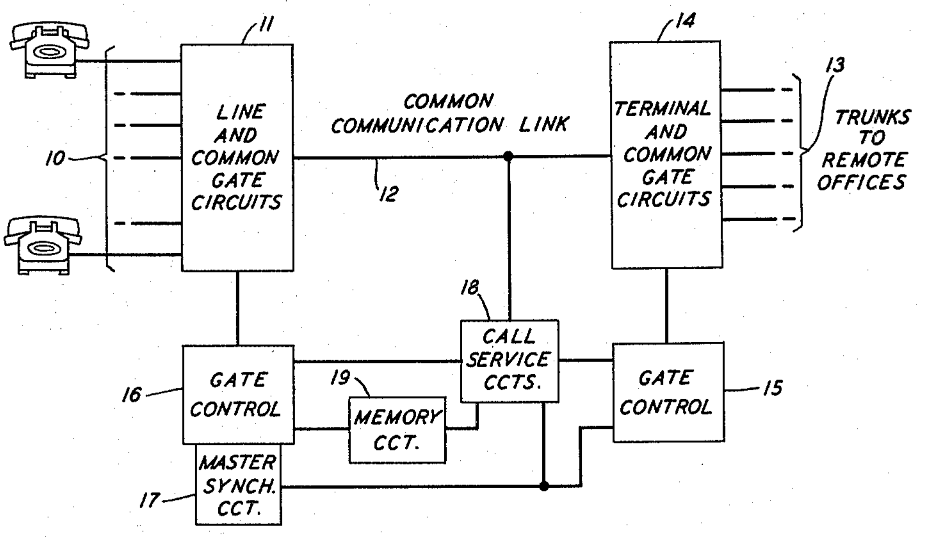
Fig. 1 is a schematic representation in block diagram form of a telephone system in which a time division hybrid arrangement in accordance with this invention may be employed.

Turning now to the drawing, the basic elements of a time divsion telephone exchange in accordance with the Burton-Robinson-Younker patent application, cited hereinbefore, are depicted in Fig. 1. As shown therein, a plurality of subscriber lines 10 are each connected through line and common gate circuits 11 to a common communication link 12. Similarly, a plurality of trunks 13 to remote offices are connected to the common communication link 12 by terminal and common gate circuits 14. The interoffice trunks in this instance serve to increase the traffic capacity of this system by providing access to various groups of subscribers in remote exchange areas.

The common gates in circuits 11 and 14 in this instance comprise "send," "receive" and clamping gates at each end of the common link 12. Such gates are operated during discrete portions of each time slot interval under control of clock pulse sources in gate controls 15 and 16. Advantageously, the clock pulse sources are synchronized such that corresponding common gates at each end of the link 12 operate simultaneously.

The terminal gates 14 are operated during assigned time slot intervals in a repetitive cycle of time slot intervals. The line gates in line and common gate circuits 11 are operated on a selective basis under control of information from a regenerative memory system included in the memory circuit 19. Each of the lines 10 is identified by a code and the line gate associated with a particular one of the lines 10 is enabled when the code for the corresponding line appears in the memory system. The line gate for an active line 10 is enabled once per office cycle in the time slot assigned to the trunk to which the line is connected. The term "time slot" may be used to denote either the interval of time for one sequential operation of the hybrid gates or the relative position of such an interval in an office cycle.

A master synchronizing circuit 17 which generates a synchronizing signal to mark the start of each time slot serves to pace all timed circuit functions. A call service selector circuit 18 receives pulse information from the common link 12, from the circulating memory 19, from the trunk gate control circuit 15, and from the master synchronizing circuit 17. This selector circuit 18 recognizes and processes requests for service. Memory circuit 19 circulates the identifying line codes, scans all the time slots, and erases from the circulating memory the code appearing in any time slot in which there is not detected a pulse indicating that the particular time slot is being used.

Figure 2:
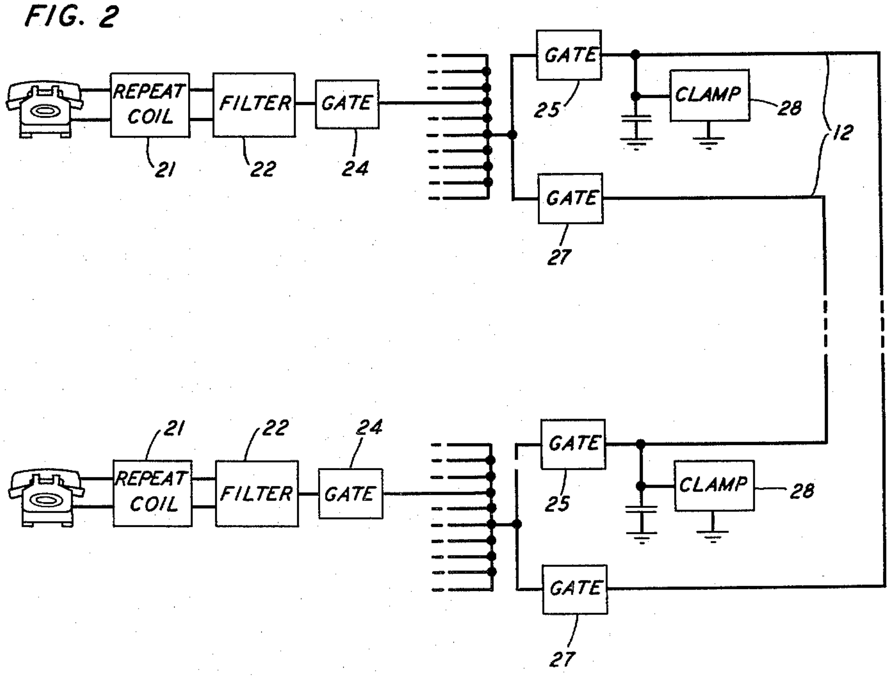
Fig. 2 is a schematic representation in block diagram form illustrating a time division hybrid arrangement in a four-wire transmission system, as known in the art.

As shown in Fig. 2, a time division hybrid arrangement which may be employed in the system of Fig. 1, as disclosed in the aforementioned James-Johannesen patent application, comprises a repeat coil 21, a filter 22, and a line gate 24 in each line circuit. The four-wire common communication link 12 comprises a "send" gate 25, and a "receive" gate 27 at each end thereof. By placing the "send" and "receive" gates in the common communication link, as shown in Fig. 2, the over-all equipment requirements for performing the switching functions in a time division system, such as that shown in Fig. 1, are drastically reduced.

At the beginning of the time slot interval, the common control circuitry translates the particular codes for the desired lines in communication over the common link 12 and directs an enabling pulse to the associated line gates 24. The line gates then remain enabled while the "send" and "receive" gates 25 and 27 at each end of the common communication link 12 are operated in sequence. In this fashion information stored in capacitance in the respective line circuits is transferred to storage capacitance in the common link 12, and thereafter information stored in the common link 12 is transferred to opposite line circuits through similar action in the hybrid at the opposite ends of the link 12. At the end of the time slot interval, the line gates 24 and "receive" gates 27 are disabled, and a clamping gate 28 at each end of the common link 12 is operated so as to discharge any signal remaining on the common link storage capacitance, thereby preparing the common link for receipt of information in a succeeding time slot.

Figure 3:
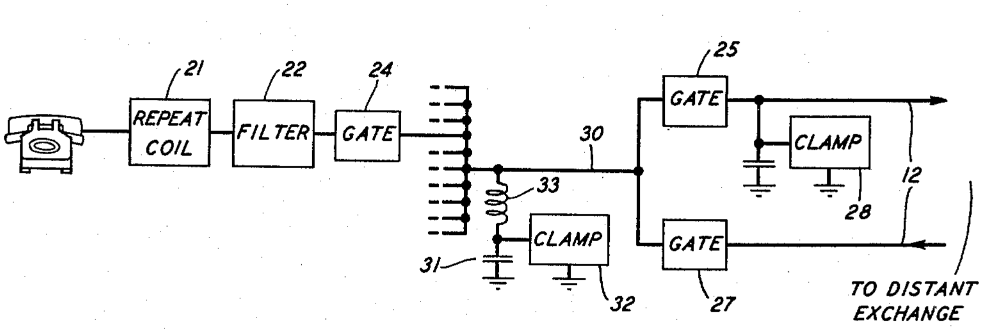
Fig. 3 is a schematic representation of one illustrative embodiment of a time division hybrid arrangement in accordance with this invention that may be employed in the telephone system of Fig. 1.

As shown in Fig. 3, in accordance with this invention, a time division hybriding arrangement permitting sequential gate operation presents an advantage over the system of Fig. 2 to the use of time sharing in a communication system by extending the time available to perform the various gating operations, particularly the line gate selection. In this sense the system in accordance with this invention permits a flexibility in the timing of the gate operations which cannot be achieved in the system as shown in Fig. 2.

For convenience, the elements of the novel hybrid circuit arrangements in accordance with this invention are shown and described hereinafter with respect to the operation at one end only of the common link 12. It is to be understood, however, that an identical operation occurs in the same timing sequence at the opposite end of the common link 12.

The basic hybrid gating arrangement of the Fig. 2 circuit, including line gates 24 in each line as well as a "send" gate 25 and a "receive" gate 27 in the common link 12, appears in the sequentially gated time division hybrid shown in Fig. 3, here shown as it appears at either end of the common link 12. In addition to these elements, the novel hybrid arrangement in accordance with this invention includes an intermediate link 30 connected between the line gates 24 and each end of the common link 12 and comprising shunt connected storage capacitance 31 and associated clamping means 32 which, in the illustrative embodiment shown in Fig. 3, are connected to inductance 33. The addition of these elements permits a retiming of the hybrid operation, such that each selected line gate is enabled once during a time slot interval for a period of time sufficient only to accomplish a resonant transfer of information therethrough.

Such resonant transfer consumes only a small portion of a time slot interval in contradistinction to the circuit of Fig. 2 in which the line gate must remain open while two resonant transfer operations occur; i.e., the resonant transfer through line and "send" gates and the resonant transfer through line and "receive" gates. Advantageously, inductance 33 is connected in the circuit of Fig. 3 between the capacitance 31 and the line gates 24 as well as between the capacitance 31 and the common link 12. This arrangement obviates the need for an inductance in each of the lines and in the common link 12 to accomplish the necessary resonant transfers.

Figure 6A:
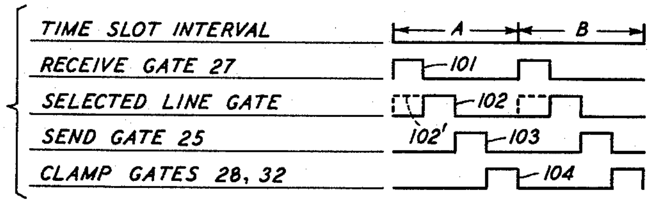
Fig. 6A is a chart illustrating the timing of the various gating circuit operations of the circuit of Fig. 3.

In accordance with the invention as depicted in Fig. 3, the storage capacitance 31 in the intermediate link 30 permits operation of the hybrid gates in a selected sequence during a time slot interval, as noted in the time sequence chart of Fig. 6A. Thus, during a time slot interval such as interval A, "receive" gate 27 is enabled for a period 101, permitting transfer of an incoming signal from the common link 12 to capacitance 31 in the intermediate link 30. Simultaneously with the disablement of "receive" gate 27, a selected line gate 24 is enabled for the period 102 and a resonant transfer occurs between the intermediate link 30 and the selected line; viz., information stored in capacitance 31 is transferred through the line gate 24 of the selected line and stored in the selected line storage capacitance, and simultaneously information stored in the selected line capacitance is transferred through the associated line gate 24 to the capacitance 31. The line gate 24 is then disabled simultaneously with the enablement of "send" gate 25, which remains enabled for the period 103 sufficient for the signal sample stored in capacitance 31 of intermediate link 30 to be transferred to storage capacitance in the common link 12. The "send" gate 25 is then disabled and the clamping gates 28 and 32 activated simultaneously for a period 104 sufficient to remove residual energy in the associated storage capacitances. The preceding operations are repeated in the next time slot interval, B, except of course, a different line gate 24 is operated. As noted hereinbefore, the same circuit and sequence of operations are utilized at the other end of the common communication link 12.

It may be noted that periods 101, 102, 103 and 104 appear in sequence, such that the line gate operation indicated by period 102 absorbs only a small fraction of the cycle of operations to be completed during a time slot interval. For comparison purposes, the period 102' required for operation of a line gate in the circuit of Fig. 2 is shown superimposed on period 102 in dotted outline indicating a length equivalent to the operating time of successively enabled "send" and "receive" gates in the circuit of Fig. 3.

Figure 4:
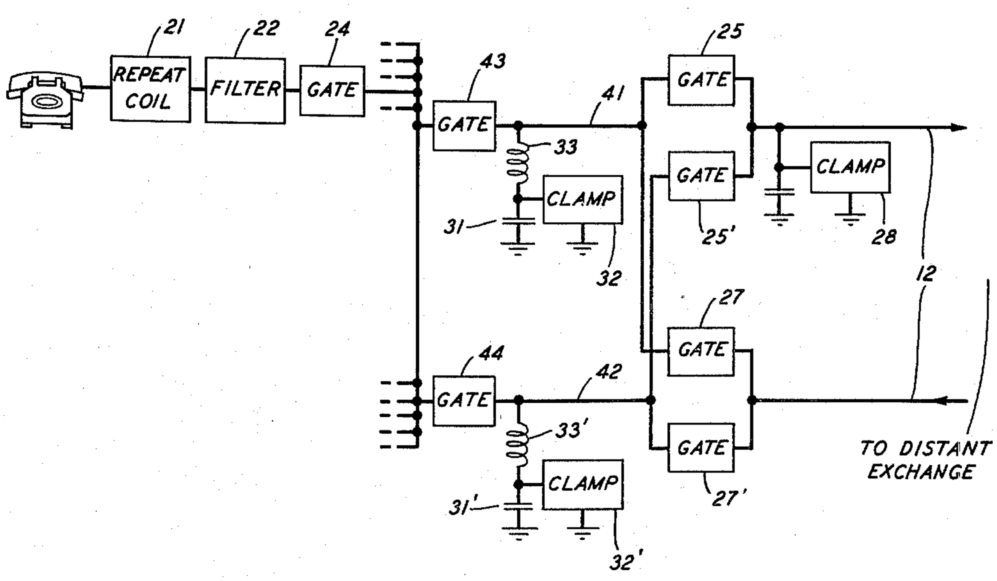
Fig. 4 is a schematic representation of the hybrid arrangement indicated in Fig. 3, utilizing duplicate storage elements.

Further advantages in flexibility may be noted in the embodiment of this invention depicted in Fig. 4. In this instance, the single intermediate link 30 in the circuit of Fig. 3 is replaced by a pair of intermediate links 41 and 42 in the circuit of Fig. 4, each link 41 and 42 comprising elements corresponding to those present in link 30, as indicated by the same and primed reference numbers in Fig. 4. Intermediate link 41 is connected to common link 12 by "send" gate 25 and "receive" gate 27, while intermediate link 42 is connected to common link 12 by a distinct pair of "send" and "receive" gates 25' and 27'. In adidtion, gates 43 and 44 are incorporated in the intermediate links 41 and 42, respectively.

Figure 6B:
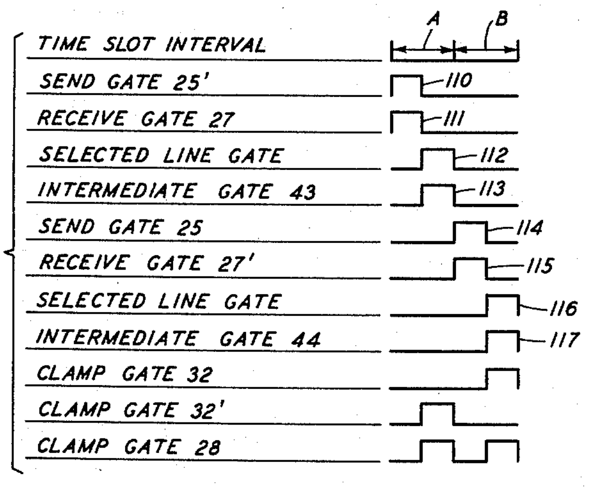
Fig. 6B is a chart illustrating the timing of the various gating circuit operations of the circuit of Fig. 4.

This modified hyrid operation is best described, again, in relation to the timing chart depicted in Fig. 6B. In time slot A, a "send" gate 25' and a "receive" gate 27 are enabled during concurrent periods 110 and 111 to effect a resonant transfer of information from the storage capacitance 31¹ in intermediate link 42 to the common link 12 and from common link 12 to storage capacitance 31 in intermediate link 41. Thereafter, a selected one of the line gates 24 and gate 43 in intermediate link 41 are enabled concurrently during periods 112 and 113, to effect a resonant transfer between the selected line and intermediate link 41. In time slot B, "send" gate 25 and "receive" gate 27′ are enabled for simultaneous periods 114 and 115, respectively, to transfer information from intermediate link 41 to the common link 12 and to transfer information from the common link 12 to intermediate link 42. Upon completion of this transfer gates 25 and 27′ are disabled and a second selected line gate 24 and gate 44, in intermediate link 42, are enabled for simultaneous periods 116 and 117, respectively, to effect a resonant transfer between this line and intermediate link 42. The various clamping operations are performed during periods as noted in Fig. 6B.

In this fashion two distinct intermediate links between the lines and common link are employed alternately for transfer of information to and from the common link, thus increasing the time available for performing the various gate operations and thereby permitting a considerable increase in speed in a time division communication system. Comparison of the time slot intervals as designated in Figs. 6A and 6B indicates the reduction by one-half achieved by employing the duplicate circuit in accordance with Fig. 4. In similar fashion, the hybrid equipment may comprise triplicated storage elements for further reduction in time slot interval, or even greater concentrations of elements to afford more flexibility for particular operations.

It may be noted that clamping of the common link storage capacitance in the arrangement of Fig. 4 is performed immediately upon disablement of a "send" gate 25 or 25′. This is essential to the operation since the common link capacitance must be free of charge prior to receipt of a new sample in the next time slot interval. In systems requiring pulse code modulation for transmission over the common link, the charge must be retained on the common link capacitance for a sufficient interval for the coding equipment to complete its function. It is apparent, therefore, that the arrangement of Fig. 4 would be ineffective in such a system unless the time slot interval were extended an amount sufficient to accommodate the coding operation.

Figure 5:
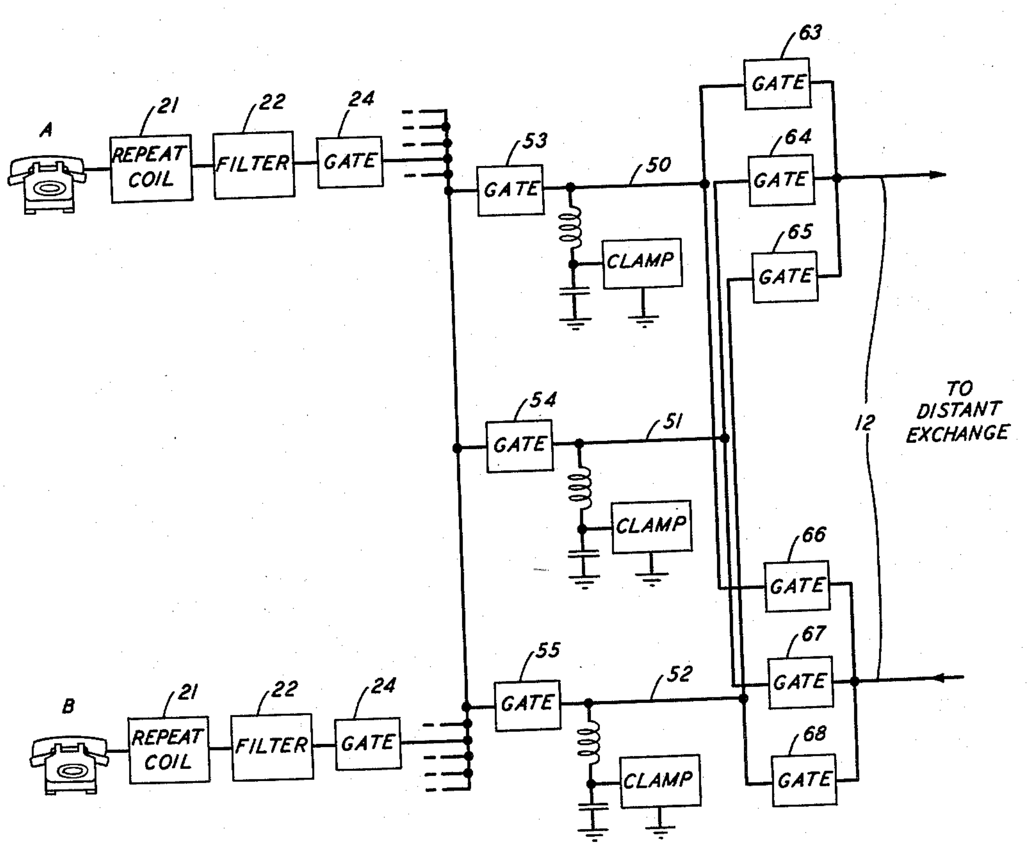
Fig. 5 is a schematic representation of another embodiment of this invention utilizing more than two intermediate storage means.

A solution to this problem which retains all of the advantages specified for the arrangement of Fig. 4 is afforded by another arrangement in accordance with this invention as shown in Fig. 5, thus further demonstrating the flexibility of my novel hybrid circuit. The arrangement of Fig. 5 comprises three intermediate links 50, 51 and 52, each comprising a gate, a storage capacitance, a clamp and a resonant transfer inductance. Each intermediate link is connected to the common link 12 by distinct "send" and "receive" gates. Advantageously in this arrangement, the intermediate capacitance also serves the purpose of the common link storage means in the systems of Figs. 2, 3 and 4.

Figure 6C:
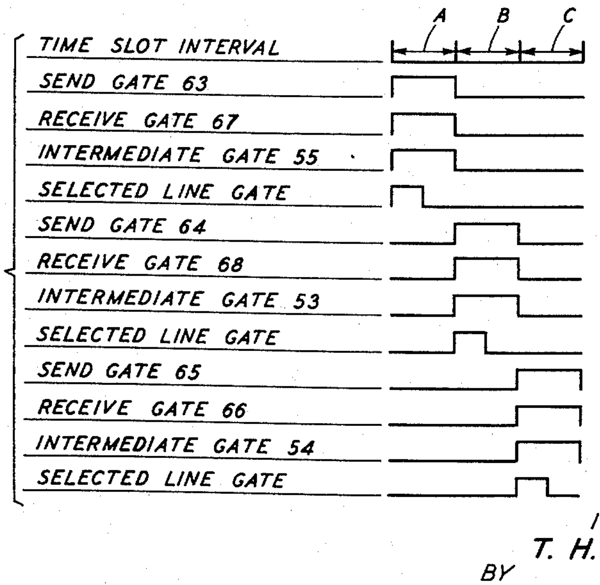
Fig. 6C is a chart illustrating the timing of the various gating circuit operations of the circuit of Fig. 5.

Considering now the timing of the Fig. 5 circuit operation, as shown in Fig. 6C, it may be noted that the "send" gates 63, 64 and 65, respectively, are enabled in sequence, each for an entire time slot interval. During a time slot interval, therefore, the information sample stored on the capacitance in the intermediate link associated with the enabled "send" gate is available to the coding equipment for a period sufficient to complete the coding operation in the common link. During the same time slot interval, a sample is transmitted from the common link to the storage capacitance in a second one of the intermediate links, and a resonant transfer is effected between a line and the storage capacitance in the second or a third one of the intermediate links. Thus the line gates again are enabled only for the resonant transfer interval, and the reduced time slot interval provided by the arrangement of Fig. 4 is thereby retained. Clamping is simplified in that ample time is available between consecutive periods of information storage on each of the three intermediate storage capacitors.

A complete cycle of operation of all gates in the circuit of Fig. 5 for interoffice calls would cover three time slot intervals and may be programed in the following manner in accordance with Fig. 6C. During time slot A "send" gate 63, "receive" gate 67, intermediate gate 55 and a selected line gate 24 are enabled concurrently. These operations permit transfers of information respectively from intermediate link 50 to common link 12, from common link 12 to intermediate link 51, from the selected line to intermediate link 52 and from intermediate link 52 to the selected line.

During time slot B "send" gate 64, "receive" gate 68, intermediate gate 53 and a second selected line gate 24 are enabled concurrently to transfer information respectively from link 51 to link 12, from link 12 to link 52, from link 50 to the second selected line and from the second selected line to link 50. During time slot C "send" gate 65, "receive" gate 66, intermediate gate 54 and a third selected line gate 24 are enabled concurrently to transfer information respectively from link 52 to link 12, from link 12 to link 50, from link 51 to the third selected line and from the third selected line to link 51.

Advantageously, each selected line gate 24 may be disabled immediately upon completion of the resonant transfer of information therethrough to ease the burden on line gate control equipment, as indicated hereinbefore. It may be noted, however, that the balance of the gates in the circuit of Fig. 5 are each enabled only once in every third time slot so that the period of their enablement may extend for a complete time slot interval. This is particularly desirable in connection with the "send" gate operation to make the information stored in an intermediate link available to coding equipment in the common link for an interval sufficient to complete the coding operation.

The circuit of Fig. 5 presents a further advantage in permitting intraoffice calls without necessitating transmission over the common link. In the system of Fig. 1, if two subscribers on distinct lines 10 in the same local exchange area desire to communicate with one another, the talking path heretofore was completed through the central office in similar fashion to a connection between subscribers in two remote exchange areas. This, of course, entails the coding and decoding of each signal sample as it is transmitted to and from the central office, respectively, as well as the use of the same central office switching facilities as a call to a distant exchange. In accordance with my invention the intermediate storage capacitance, in conjunction with proper programing of gate operation, permits intraoffice connections such as that described but in which the information exchanged by the two local subscribers is not transmitted over the common link.

For example, consider that the subscriber on line A, Fig. 5, desires to talk to the subscriber on line B in the same local exchange area. The common control, which may be in an area remote from the local office, recognizes the intraoffice call request and programs the gating operation upon completion of the connection in the following manner. Assuming that intermediate link 50 is reserved for intraoffice calls, the line gate 24 associated with line A and intermediate gate 53 are enabled concurrently during the time slot assigned to line A to perform a resonant transfer of information to and from intermediate link 50. The sample is retained in the storage capacitance of link 50 until the time slot of line B is reached. At this time the line gate 24 associated with line B and intermediate gate 53 are enabled, and a resonant transfer to and from intermediate link 50 again is performed. The common link gates associated with intermediate link 50; viz., "send" gate 63 and "receive" gate 66, are not operated during the intraoffice call so that none of the samples are transmitted over the common link 12. A suitable number of intermediate links may be allocated to intraoffice connections in accordance with the traffic conditions encountered. One, two, or three intermediate links are reserved for interoffice traffic in accordance with the operation described with respect to Figs. 3, 4 and 5, respectively.

It is to be understood that the above-described arrangements are illustrative of the application of the principles of this invention. Numerous other arrangements may be devised by those skilled in the art without departing from the spirit and scope of this invention.

What is claimed is:

1. In a time division communication system having a plurality of lines and a common communication link between first and second groups of said lines, a sequentially gated hybrid circuit at each end of said link comprising line gating means in each of said lines and send and receive gating means in said link, storage means, means connecting one side of said storage means to one side of each of said line gating means, means connecting said one side of said storage means to said send and receive gating means, and means for enabling in sequence said line, send and receive gating means.

2. A time division switching system comprising a plurality of lines, a common communication link, a line gate individual to each of said lines, said common link comprising a pair of channels for transmission in opposite directions, each of said channels comprising send gating means and receive gating means, means connecting said line gates in common to said common link, storage means connected to said connecting means, means defining a plurality of distinct time slots in a repetitive cycle, and means for enabling during each of said time slots said receive gating means, said line gating means in a selected line and said send gating means to transfer information respectively from said link to said storage means, between said storage means and said selected line, and from said storage means to said common link.

3. A time division switching system in accordance with claim 2 wherein said connecting means comprises inductance means in circuit with said storage means.

4. A time division switching system in accordance with claim 2 and further comprising inductance means connected between said storage means and said connecting means.

5. A time division switching system in accordance with claim 2 wherein said storage means comprises a capacitance.

6. A time division switching system in accordance with claim 5 and further comprising discharging means connected to said capacitance and means for enabling said discharging means.

7. A time division switching system in accordance with claim 6 and further comprising means for timing the operation of said enabling means to enable said receive, line and send gating means and said discharging means in sequence during each time slot.

8. A time division communication system comprising a plurality of lines, a bilateral transmission link and gated hybrid means for connecting communicating pairs of said lines to said link during discrete time slots in a repetitive cycle of time slots, said hybrid means comprising, at each end of said link, send and receive gating means in said link, line gating means in each of said lines, means connecting said line gating means in common between said send and receive gating means, storage means connected to said connecting means, and means for enabling said send, receive and line gating means during discrete portions of each of said time slots.

9. A time division communication system in accordance with claim 8 wherein said send gating means comprises first and second send gates, said receive gating means comprises first and second receive gates and said connecting means comprises a first intermediate gate connected between said line gates and said first send and receive gates and a second intermediate gate connected between said line gates and said second send and receive gates.

10. A time division communication system in accordance with claim 9 wherein said connecting means further comprises inductance means connected in circuit with each of said first and second intermediate gates.

11. A time division communication system in accordance with claim 9 wherein said storage means comprises a first capacitance connected in circuit with said first intermediate gate and a second capacitance connected in circuit with said second intermediate gate, and further comprising means for timing the operation of said enabling means to enable said first send gate and said second receive gate simultaneously during one portion of a time slot interval to transfer information from said first capacitance to said link and from said link to said second capacitance, to enable a first selected line gate and said second intermediate gate during another portion of said one time slot interval to transfer information between said first selected line and said second capacitance, to enable said second send gate and said first receive gate during a portion of a different time slot interval to transfer information from said second capacitance to said common link and from said common link to said first capacitance and during another portion of said different time slot interval to enable said first intermediate gate and a second selected line gate to transfer information between said second selected line and said first capacitance.

12. A time division communication system in accordance with claim 11 and further comprising inductance means connected in circuit with said first capacitance and in circuit with said second capacitance.

13. A time division communication system in accordance with claim 11 and further comprising means for discharging said first and second capacitance after transfer of information from each said capacitance to said link.

14. A time division communication system comprising a plurality of lines each comprising a line gate, a common communication link including a pair of channels for transmission in opposite directions, each of said channels comprising send gating means and receive gating means, means comprising storage means connected between said common link and said lines, means for enabling selected ones of said line gates to transfer information from said selected lines to said storage means and from said storage means to said selected lines, means for enabling said send gating means to transfer information from said storage means to said common link, means for enabling said receive gating means to transfer information from said link to said storage means, and means for activating said enabling means during distinct time slot intervals.

15. A time division communication system in accordance with claim 14 wherein said connecting means further comprises intermediate gating means, inductance means, clamping means and means for enabling said clamping means to discharge said storage means during distinct time intervals.

16. A time division communication system in accordance with claim 15 wherein said connecting means further comprises a plurality of parallel paths, each of said paths including one of each of said intermediate gating means, said inductance means, said storage means and said clamping means, said send gating means comprising a plurality of send gates and said receive gating means comprising a plurality of receive gates each connected to a corresponding one of said plurality of send gating means and to a corresponding one of said parallel paths.

17. A time division communication system in accordance with claim 16, further comprising means for timing the operation of said enabling means so that said send gating means is enabled for an entire time slot interval and one of said intermediate gating means, a selected one of said line gates and said receive gating means are each enabled during said time slot interval.

18. A time division communication system in accordance with claim 16, further comprising means for timing the operation of said enabling means so that one of said intermediate gating means and a first one of said line gates are enabled during one time slot interval to transfer information from said first line to one of said storage means and so that said one of said intermediate gating means and a second one of said line gates are enabled during another time slot interval to transfer said first line information as stored in said one of said storage means from said one of said storage means to said second line.

References Cited in the file of this patent

UNITED STATES PATENTS

| | | |
|---|---|---|
| 2,490,833 | Ransom | Dec. 13, 1939 |
| 2,695,333 | Harper | Nov. 23, 1954 |
| 2,870,259 | Norris | Jan. 20, 1959 |